US012599249B2

(12) United States Patent　　　　(10) Patent No.:　US 12,599,249 B2

Yi　　　　　　　　　　　　　　　　　　(45) **Date of Patent:　*Apr. 14, 2026**

(54) ANTI-ROLLOVER STRUCTURE, CARRYING DEVICE AND BABY CARRIER

(71) Applicant: WONDERLAND SWITZERLAND AG, Steinhausen (CH)

(72) Inventor: Xiaolong Yi, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,133

(22) Filed: May 27, 2024

(65) Prior Publication Data

US 2024/0308566 A1　　Sep. 19, 2024

Related U.S. Application Data

(63) Continuation of application No. 17/308,073, filed on May 5, 2021, now Pat. No. 12,024,217.

(30) Foreign Application Priority Data

May 6, 2020　(CN) .......................... 202010371502.0

(51) Int. Cl.
　　*A47D 13/02*　　　(2006.01)
　　*A47D 9/00*　　　(2006.01)
　　*B62B 7/14*　　　(2006.01)
　　*B62B 9/12*　　　(2006.01)

(52) U.S. Cl.
　　CPC ........... *A47D 13/027* (2022.08); *A47D 9/005* (2013.01); *A47D 9/016* (2022.08); *A47D 13/02* (2013.01); *B62B 7/14* (2013.01); *B62B 9/12* (2013.01)

(58) Field of Classification Search
　　CPC .......... B62B 7/14; A47D 9/016; A47D 13/02; A47D 13/027; B60N 2/2824; B60N 2/2848; B60N 2/2839
　　See application file for complete search history.

(56) References Cited

U.S. PATENT DOCUMENTS 9,693,636 B2 * 7/2017 Yang ........................ A47D 1/00
9,955,801 B2 * 5/2018 Yu .......................... A47D 1/008

FOREIGN PATENT DOCUMENTS

| CN | 205344586 U | * | 6/2016 |
| CN | 105768701 A | | 7/2016 |
| CN | 106976471 A | | 7/2017 |
| CN | 207274870 U | | 4/2018 |
| KR | 102007118 B1 | | 8/2019 |

OTHER PUBLICATIONS

2nd Office Action issued to China counterpart application (application No. 202010371502.0) on Apr. 26, 2024.

* cited by examiner

*Primary Examiner* — David R Dunn
*Assistant Examiner* — Tania Abraham

(57)　　　　ABSTRACT

An anti-rollover structure, applicable to the cot body, includes at least two fixing elements and at least two support elements. The fixing elements are adapted to be mounted on an outer bottom surface of the cot body. The support elements are rotatably disposed at the fixing elements respectively. When the support elements are on a support surface, the support elements are subjected to pressure from the cot body and thereby rotated to protrude protruded from the cot body. A carrying device and a baby carrier are further introduced. The carrying device and the baby carrier each have the anti-rollover structure.

15 Claims, 9 Drawing Sheets

100

20—

21

10—

A

1000

100

101

10

200

100

100

100

100

10

ANTI-ROLLOVER STRUCTURE, CARRYING DEVICE AND BABY CARRIER

CROSS-REFERENCE TO RELATED APPLICATION

This application is a continuation application claiming priority under 35 U.S.C. § 120 to U.S. patent application Ser. No. 17/308,073 filed on May 5, 2021, which claims priority under 35 U.S.C. § 119(a) to Patent Application No. 2020103715020 filed in China on May 6, 2020, and the entire contents of these applications are hereby incorporated by reference.

BACKGROUND OF THE INVENTION

1. Field of the Invention

The present disclosure relates to the technical field of baby products, and in particular to an anti-rollover structure, carrying device and baby carrier.

2. Description of the Related Art

A conventional carrycot is either independently used or mounted on a stroller or automobile seat. The carrycot not only provides a baby with a comfortable, safe sleeping environment but also enables a caretaker to look after the baby conveniently. While the carrycot is independently in use, its bottom surface is in contact with the ground and thus gets dirty readily, not to mention that the carrycot poses a safety threat to the baby, as the baby in the carrycot might rotate its body, or the carrycot might tumble because of an outsider's negligence, thereby predisposing the carrycot to rollovers. In this regard, existing anti-rollover carrycot structure is difficult to manipulate outdoors by caretakers.

Therefore, it is imperative to provide a carrycot structure which is simple, easy to manipulate, and effective in preventing rollovers.

BRIEF SUMMARY OF THE INVENTION

An objective of the present disclosure is to provide an anti-rollover structure which is structurally simple, easy to manipulate, and effective in preventing rollovers and a carrying device with the anti-rollover structure.

Another objective of the present disclosure is to provide a baby carrier with an anti-rollover structure. When independently used, the anti-rollover structure prevents rollovers and renders the baby carrier safe and reliable. The anti-rollover structure and the baby carrier work together easily but do not interfere with each other.

To achieve at least the above objective, the present disclosure provides an anti-rollover structure applicable to a cot body. The anti-rollover structure includes at least two fixing elements and at least two support elements. The fixing elements are adapted to be mounted on an outer bottom surface of the cot body. The support elements are rotatably disposed at the fixing elements respectively. When the support elements are on a support surface, the support elements are subjected to pressure from the cot body and thereby rotated to protrude protruded from the cot body.

In order to achieve the above and other objectives, the present disclosure further provides a carrying device including a cot body, at least two fixing elements and at least two support elements. The fixing elements are mounted on an outer surface of the cot body. The support elements are rotatably disposed at the fixing elements respectively and subjected to pressure from the cot body and thereby protrude from the cot body.

Compared with the prior art, the present disclosure provides a carrying device which comprises a cot body and an anti-rollover structure disposed on the outer bottom surface of the cot body. The anti-rollover structure comprises a fixing element mounted on the cot body and a support element movably disposed on the fixing element. When placed on the cot body, the, support surface exerts the supporting force on the support element, such that the anti-rollover structure is subjected to pressure from the cot body, allowing the support element to protrude from the cot body. Upon cessation of pressure otherwise exerted by the cot body on the support element, rollovers cannot happen, and the support element can restore its initial position under its own weight. According to the present disclosure, the anti-rollover structure has advantages as follows: the pressure from the cot body enables the support element to protrude from the cot body and prevents rollovers; the anti-rollover structure is simple and convenient and thus dispenses with any other complicated operation, thereby having an anti-rollover function and enhancing the ease of use of the carrycot by caretakers. When the cot body separates from the contact surface, the support element returns to its initial position under its own weight, and thus it is structurally simple and easy to use.

Preferably, the support elements are simultaneously rotated to protrude from the cot body when being on the support surface.

Preferably, the anti-rollover structure further includes a position-restoring element with resilience, which is disposed between the fixing elements and the support elements.

Preferably, the support elements are subjected to pressure from the cot body to overcome resistance of the position-restoring element and thereby rotated to protrude from the cot body.

Preferably, the position-restoring element constantly has a position restoration tendency whereby the support elements retreat to the bottom surface of the cot body.

Preferably, the fixing elements respectively have a mounting portion for mounting the support elements, and the support elements are movably mounted on the mounting portion.

Preferably, the support elements respectively have a rotation portion operating in conjunction with the mounting portion, and the support elements respectively rotate about the rotation portion relative to the mounting portion.

Preferably, the position-restoring element is penetratingly mounted on the mounting portion or the rotation portion, the fixing elements resiliently press against an end of the position-restoring element, and the support elements resiliently press against another end of the position-restoring element.

Preferably, the support elements respectively have a first arcuate surface. The fixing elements respectively have a second arcuate surface operating in conjunction with the first arcuate surface, and the support elements are subjected to pressure from the cot body, allowing the first arcuate surface to rotate across the second arcuate surface.

Preferably, the support elements respectively have a mounting groove operating in conjunction with the fixing elements. An end of each of the fixing element is positioned distal to the cot body and disposed in the mounting groove, and the first arcuate surface is formed on an inner surface of the mounting groove.

Preferably, the fixing elements respectively have a cam portion disposed in the mounting groove, and the second arcuate surface is formed on an outer surface of the cam portion.

Preferably, the position-restoring element is mounted on the fixing elements or the support elements. An end of the position-restoring element resiliently presses against the inner surface of the mounting groove, and another end of the position-restoring element resiliently presses against the inner surface of the cam portion.

Preferably, the second arcuate surface has a first cam surface and a second cam surface, and the support elements are subjected to pressure from the cot body, such that the mounting groove in contact with the first cam surface rotates until the mounting groove comes into contact with the second cam surface.

Preferably, the support elements tilt by a predetermined angle in a first direction, such that the support elements constantly tend to protrude outward.

Preferably, an end of each of the support element is positioned distal to the fixing elements and has a rounded barb.

Preferably, the position-restoring element is a torsion spring.

Preferably, the fixing elements further respectively include a fixing portion, and the fixing elements are mounted on the cot body through the fixing portions.

Preferably, a support portion is disposed on each of the support elements, and the support portion is a flat structure in contact with the support surface to prevent rollovers of the cot body.

Preferably, the cot body is a carrycot.

In order to achieve the above and other objectives, the present disclosure further provides a baby carrier including a carrier body and the carrying device, wherein the cot body is removably disposed at the carrier body.

Preferably, the carrier body is a stroller, bassinet or playpen.

Compared with the prior art, the present disclosure has advantages described below. The carrying device in the baby carrier has the anti-rollover structure. When working with the carrier body, the anti-rollover structure does not protrude from the cot body and thus is easy to mount in place and unlikely to interfere with an assembly process. When the carrying device is independently used, the weight of the cot body acts on the support element, such that the support element protrudes from the cot body and thus prevents rollovers thereof. According to the present disclosure, the baby carrier is structurally simple and easy to use. The carrying device being independently in use prevents rollovers and thus is safe and reliable. The carrying device and the carrier work together easily and do not interfere with each other.

DETAILED DESCRIPTION OF THE INVENTION

To facilitate understanding of the object, characteristics and effects of this present disclosure, embodiments together with the attached drawings for the detailed description of the present disclosure are provided.

Figure 1:
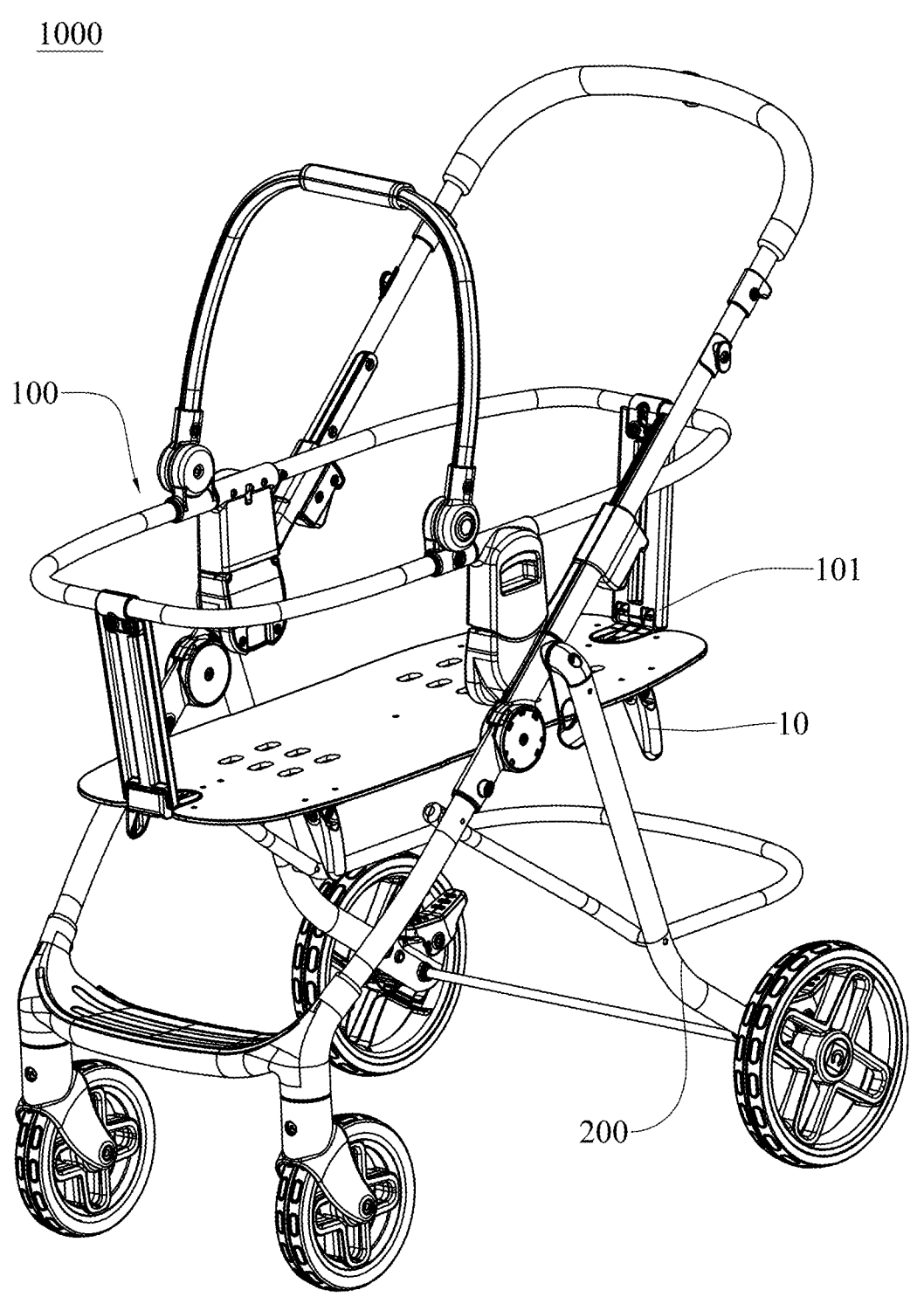
FIG. 1 is a schematic view of a baby carrier according to an embodiment of the present disclosure.
Figure 2:
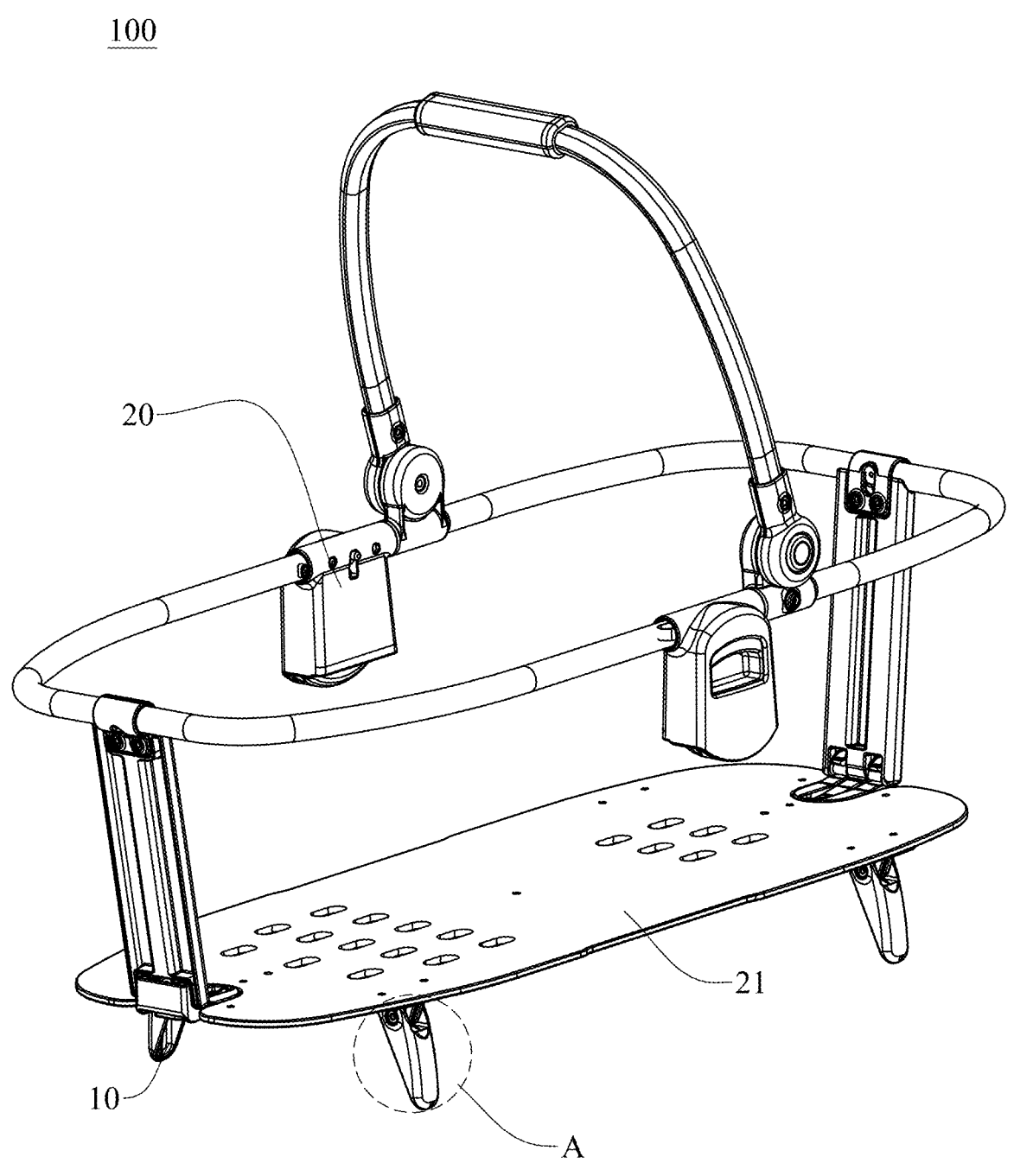
FIG. 2 is a schematic view of an anti-rollover structure shown in FIG. 1 and operated in the first state.

Referring to FIG. 1, according to the present disclosure, a baby carrier 1000 comprises a carrier body 200 and a carrying device 100. A cot body 20 of the carrying device 100 is removably disposed at the carrier body 200. The cot body 20 is a carrycot 101. According to the present disclosure, the carrycot 101 in the baby carrier 1000 has an anti-rollover structure 10. When the carrycot 101 and carrier body 200 operate in conjunction with each other, the anti-rollover structure 10 does not protrude from the carrycot 101; thus, the aforesaid components fit to each other easily but do not interfere with each other. When the carrycot 101 is independently used, the weight of the carrycot 101 acts on the support element 12, and thus the support element 12 moves and protrudes from the carrycot 101 to come into contact with a support surface, exert a supporting force and preclude rollovers. Understandably, the support surface is a surface which supports the support element 12, such as a ground surface or a desk surface. According to the present disclosure, the baby carrier 1000 is structurally simple and easy to use. The carrycot 101 being independently in use prevents rollovers and is safe and reliable. The carrycot 101 and the carrier body 200 operate in conjunction with each other easily but do not interfere with each other. The carrier body 200 is a stroller, a bassinet, playpen or the like. The carrycot 101 can be either independently used or operated in conjunction with a stroller, bassinet or playpen and thus has wide applications. The carrying device 100 and anti-rollover structure 10 of the present disclosure are illustrated with FIG. 2 through FIG. 9 and described below.

Referring to FIG. 2, FIG. 4 through FIG. 7, according to the present disclosure, the carrying device 100 comprises the cot body 20 and the anti-rollover structure 10 disposed on the outer bottom surface of the cot body 20. The anti-rollover structure 10 comprises a fixing element 11 and a support element 12. The fixing element 11 is mounted on the outer bottom surface of the cot body 20. The support element 12 is movably disposed at the fixing element 11. The support element 12 is subjected to pressure from the cot body 20, such that support element 12 moves out of the cot body 20; thus, the support element 12 protrudes from the cot body 20, allowing forming an expanded support structure for supporting the cot body 20 and ensuring the stability of the cot body 20. Upon cessation of the supporting force otherwise exerted by the support surface on the support element 12, the support element 12 returns to its initial position under its own weight and thus retreats to the bottom surface of the cot body 20, so as to prevent intervention from happening during the assembly process.

According to the present disclosure, the carrying device 100 comprises the cot body 20 and the anti-rollover structure 10 disposed on the outer bottom surface of the cot body 20. The anti-rollover structure 10 comprises the fixing element 11 mounted on the cot body 20 and the support element 12 movably disposed on the fixing element 11. When the cot body 20 is in place, the support surface exerts a supporting force on the support element 12, such that the anti-rollover structure 10 is subjected to pressure from the cot body 20, allowing the support element 12 to protrude from the cot body 20 and preventing rollovers thereof. Upon cessation of pressure otherwise exerted by the cot body 20 on the support element 12, the support element 12 returns to its initial position by its own weight. According to the present disclosure, the anti-rollover structure 10 has advantages as follows: the support element 12 protrude from the cot body 20 under the pressure from the cot body 20 and thus preclude rollovers thereof; thus, the anti-rollover structure 10 is structurally simple and easy to use and has an anti-rollover function. When the cot body 20 functions as the carrycot 101, caretakers can use the carrycot 101 conveniently. When the cot body 20 separates from the contact surface, the support element 12 returns to its initial position by its own weight, is structurally simple, and is easy to use.

Figure 3:
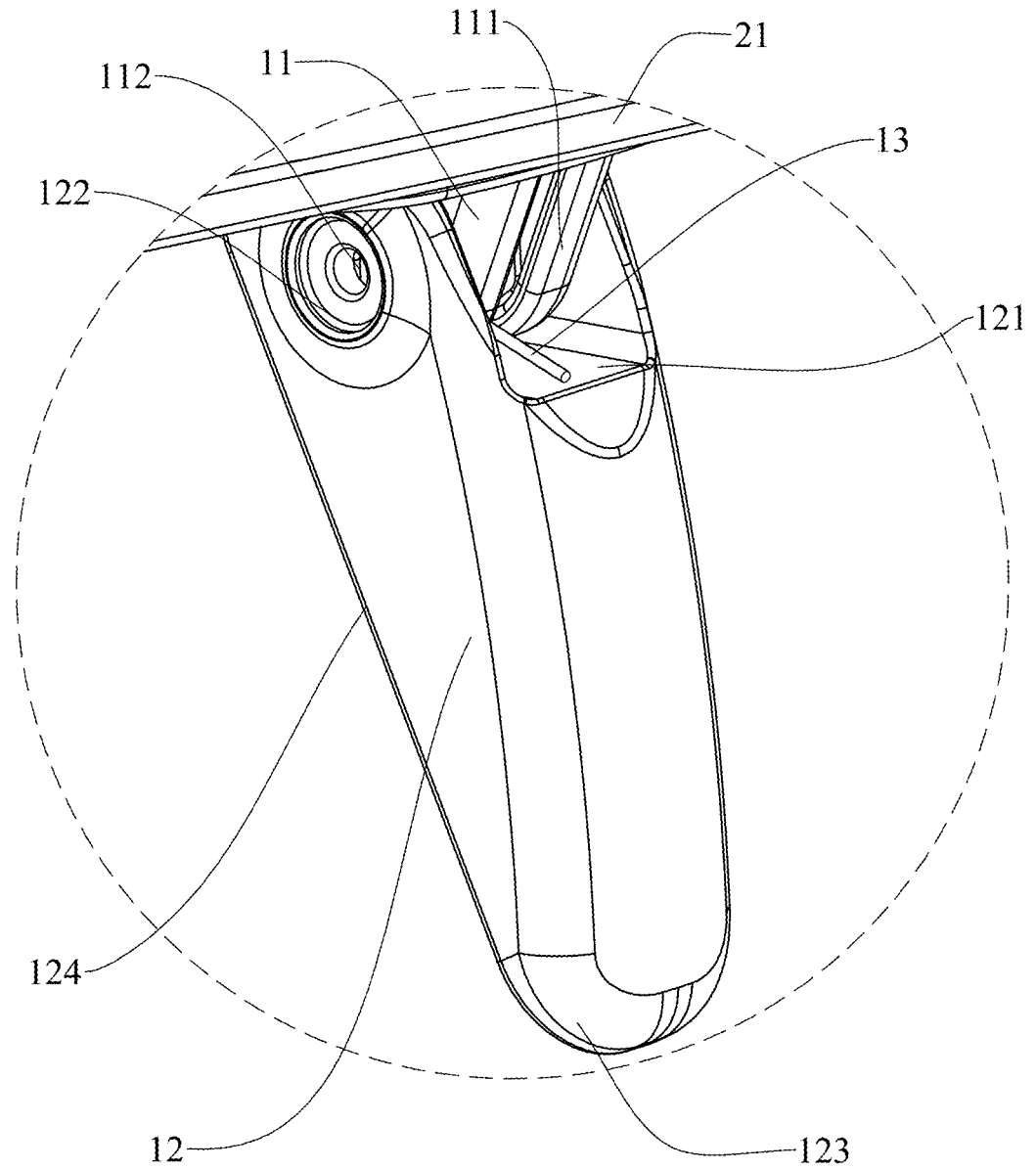
FIG. 3 is an enlarged view of part A in FIG. 2.
Figure 4:
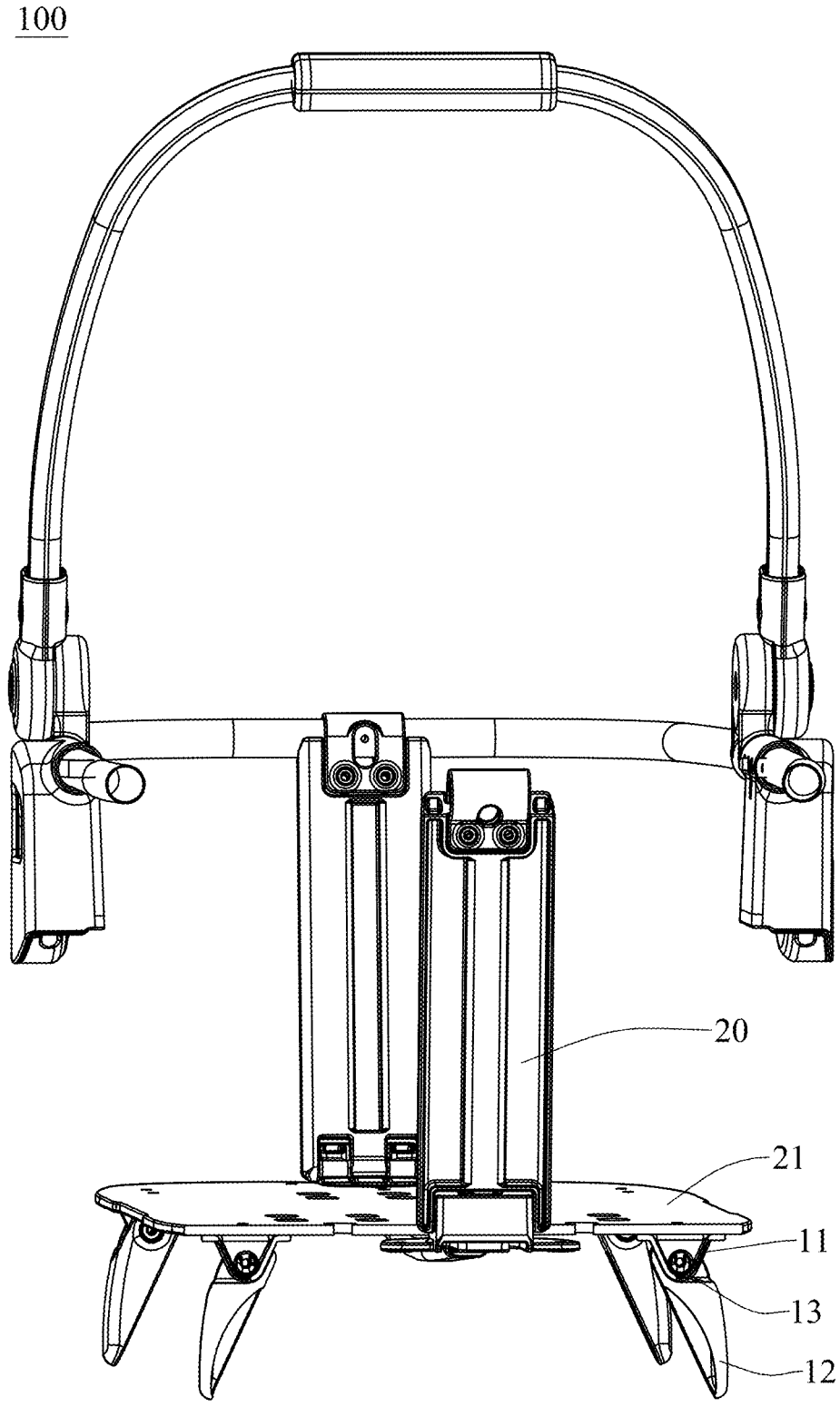
FIG. 4 is a schematic view of the anti-rollover structure in FIG. 2 when viewed from another angle.
Figure 5:
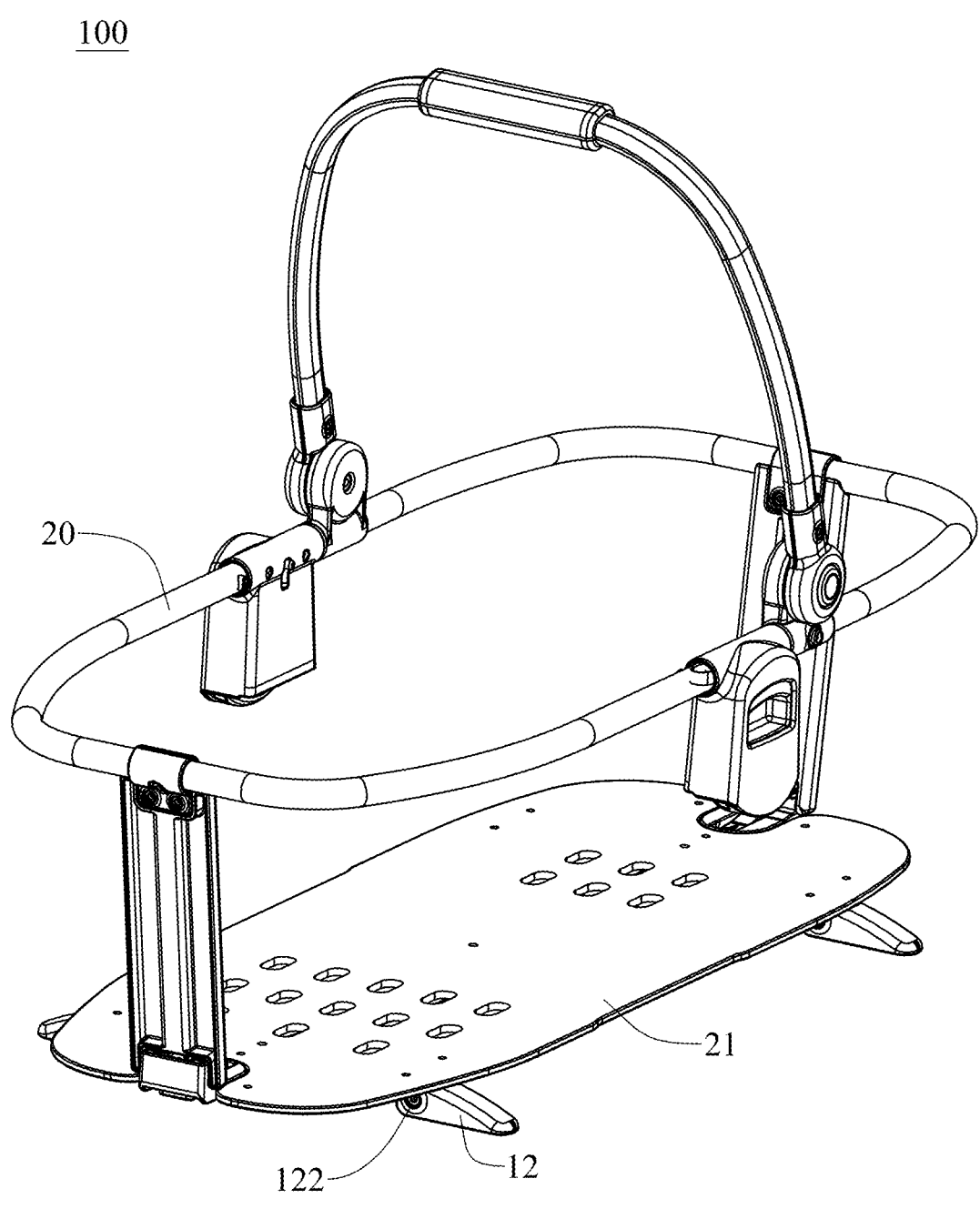
FIG. 5 is a schematic view of the anti-rollover structure shown in FIG. 1 and operated in the second state.
Figure 6:
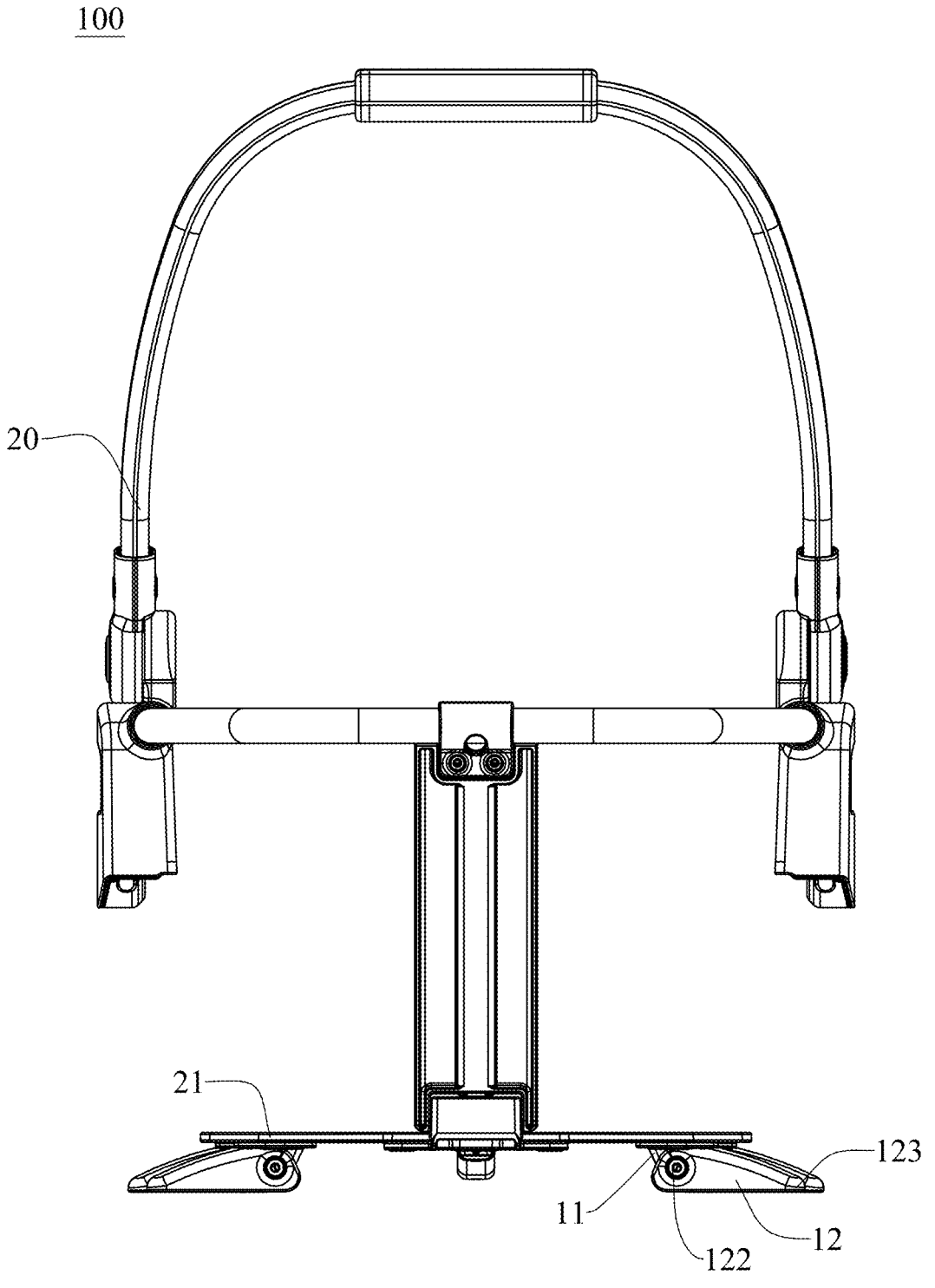
FIG. 6 is a schematic view of the anti-rollover structure in FIG. 5 when viewed from another angle.
Figure 7:
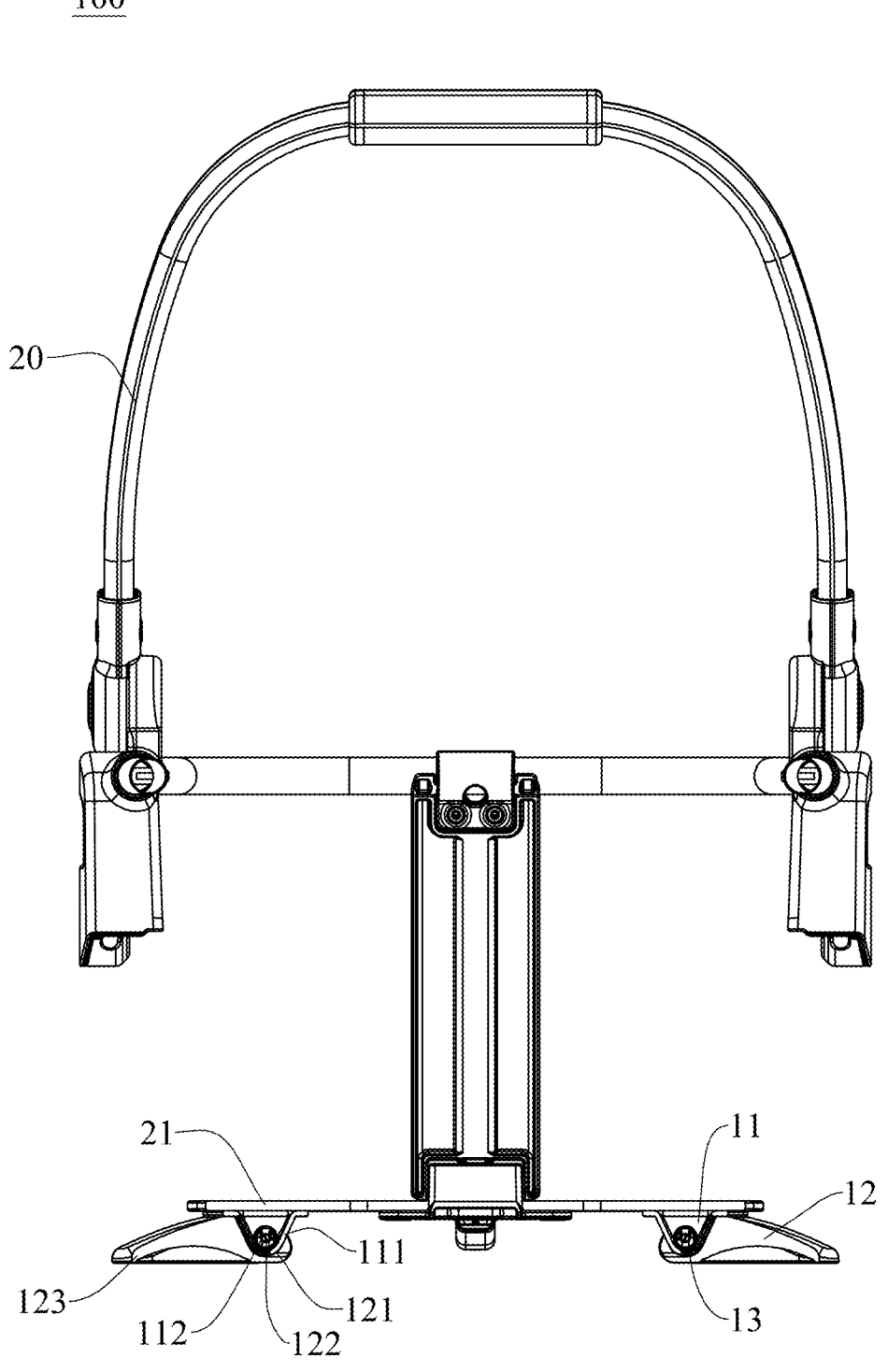
FIG. 7 is a schematic view of the anti-rollover structure in FIG. 5 when viewed from yet another angle.
Figure 8:
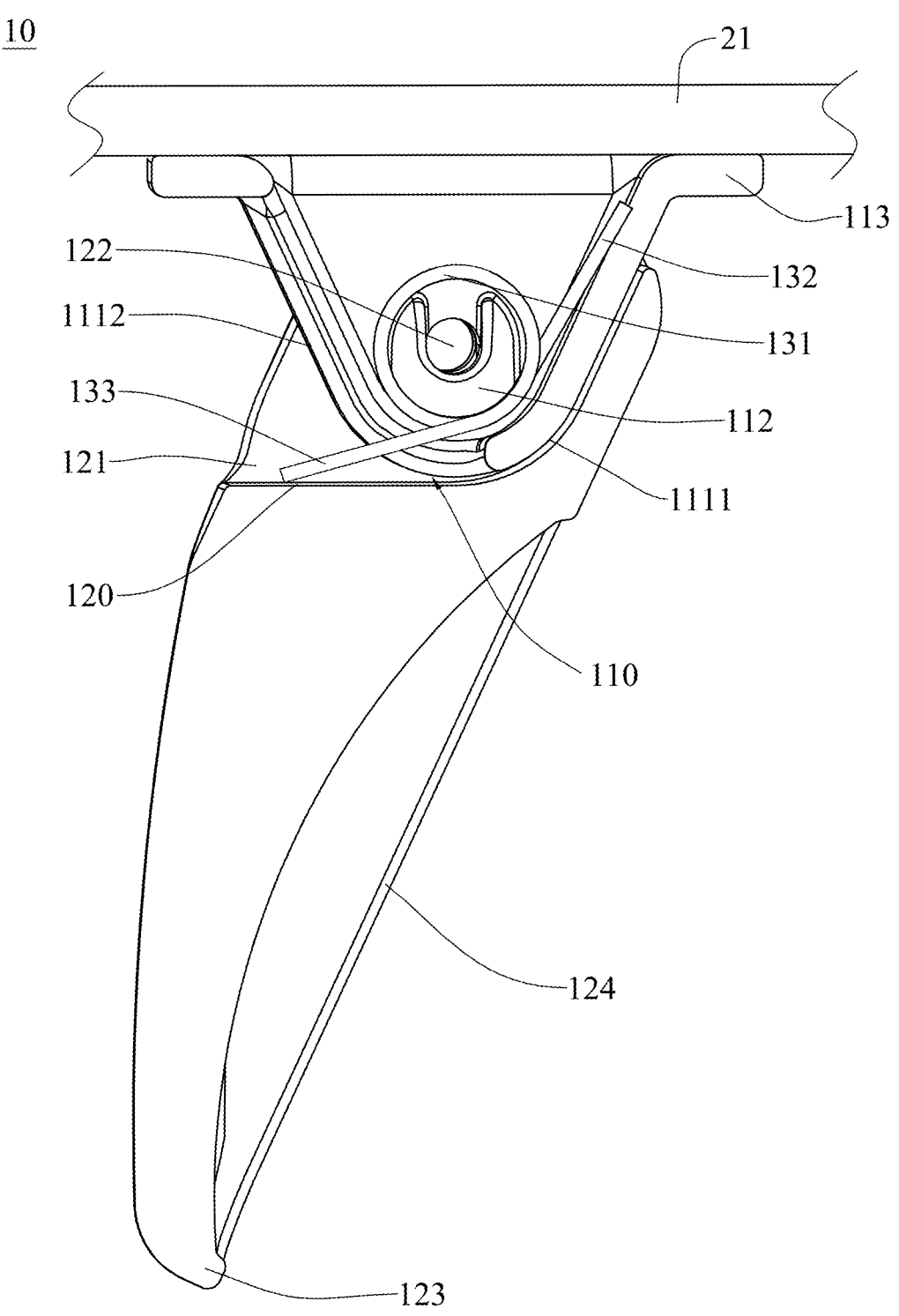
FIG. 8 is a schematic view of a support element and a fixing element operating in conjunction with each other in the first state according to an embodiment of the present disclosure.
Figure 9:
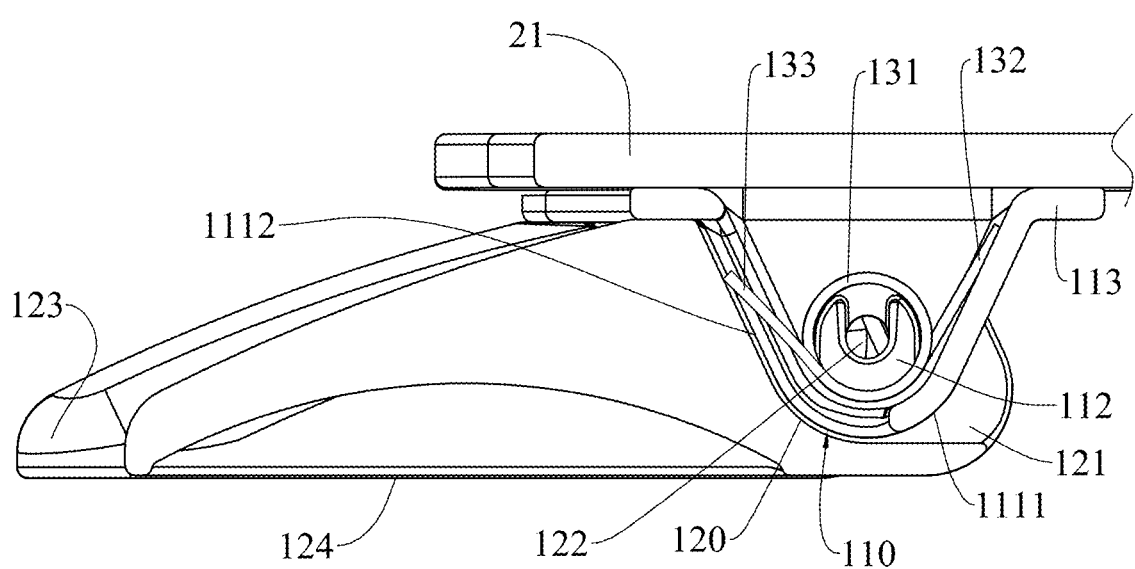
FIG. 9 is a schematic view of the support element and the fixing element operating in conjunction with each other in the second state according to an embodiment of the present disclosure.

Referring to FIG. 3, FIG. 8 and FIG. 9, in an embodiment, a position-restoring element 13 with resilience is disposed between the fixing element 11 and the support element 12. Understandably, with the position-restoring element 13 being disposed between the support element 12 and the fixing element 11, the support element 12 in use cannot move. The support element 12 is subjected to pressure from the cot body 20 to overcome the resistance of the position-restoring element 13 and thereby moves and protrudes from the cot body 20. When the cot body 20 is in place, the support surface exerts a supporting force on the support element 12, such that the anti-rollover structure 10 is subjected to pressure from the cot body 20, allowing the support element 12 to overcome the resistance of the position-restoring element 13 and thereby move and protrude from the cot body 20. The position-restoring element 13 constantly tends to enable the support element 12 to retreat to the bottom surface of the cot body 20. Upon cessation of the supporting force otherwise exerted by the support surface on the support element 12, the position-restoring element 13 drives the support element 12 to restore its initial position. In the course of supporting the cot body 20, the position-restoring element 13 constantly tends to enable the support element 12 to restore its initial position. Thus, the support element 12 is tense throughout the course of supporting the cot body 20, such that the support element 12 always presses against the support surface and thereby is always in tight contact therewith. Moreover, when the cot body 20 is lifted, the support element 12 automatically moves to below the bottom surface of the cot body 20.

Referring to FIG. 3, FIG. 8 and FIG. 9, in an embodiment, a mounting portion 112 for mounting the support element 12 in place is disposed on the fixing element 11, and a rotation portion 122 operating in conjunction with the mounting portion 112 is disposed on the support element 12, allowing the support element 12 to rotate about the rotation portion 122. For instance, the mounting portion 112 is a hole, whereas the rotation portion 122 is an axle or an engaging block. Thanks to the axle/engaging block, the support element 12 is mounted in place inside a hole of the fixing element 11 and rotates about the mounting portion 112, thereby ensuring firm connection and smooth rotation. Alternatively, the mounting portion 112 is a rotating shaft, whereas the rotation portion 122 is a hole, allowing the support element 12 to be engaged with and mounted on the fixing element 11 and rotated about the rotating shaft. Understandably, the mounting portion 112 and rotation portion 122 may also be holes connected by a rotating shaft. In this embodiment, the support element 12 rotates relative to the fixing element 11 and acts on a contact surface, such that the support element 12 is easy to rotate and operate.

Referring to FIG. 3, FIG. 8 and FIG. 9, in an embodiment, the position-restoring element 13 comprises a central portion 131, a first end portion 132 and a second end portion 133. The central portion 131 is penetratingly mounted on the mounting portion 112 or rotation portion 122. In some exemplaries, the mounting portion 112 is a rotating shaft, the central portion 131 is mounted on mounting portion 112. In other exemplaries, the rotation portion 122 is a rotating shaft, the central portion 131 is mounted on rotation portion 122. Understandably, the position-restoring element 13 is able to be mounted on a rotating shaft which connects the fixing element 11 and support element 12. The position-restoring element 13 is mounted on the mounting portion 112 or rotation portion 122, and then the mounting portion 112 operates in conjunction with the rotation portion 122, such that the position-restoring element 13 is firmly mounted on the fixing element 11 or support element 12 but cannot escape from the rotating shaft in the course of the movement of the support element 12. The fixing element 11 resiliently presses against one end of the position-restoring element 13. The support element 12 resiliently presses against the other end of the position-restoring element 13. Thus, the first end portion 132 of the position-restoring element 13 resiliently presses against the fixing element 11, whereas the second end portion 133 of the position-restoring element 13 resiliently presses against support element 12. In this embodiment, the position-restoring element 13 is a torsion spring. The torsion spring is structurally simple and easy to use. The central portion 131 of the torsion spring fits around the rotating shaft, and then the torsion spring is prevented from sliding axially because of the mounting portion 112 and rotation portion 122. The first end portion 132 of the torsion spring resiliently presses against the fixing element 11. The second end portion 133 of the torsion spring resiliently presses against the support element 12. Understandably, when the support element 12 rotates, the support element 12 compresses the torsion spring, such that the torsion spring stores energy. Upon cessation of pressure otherwise exerted by the cot body 20 on the support element 12, the torsion spring drives the support element 12 to return to its initial position.

Referring to FIG. 8 and FIG. 9, in an embodiment, the support element 12 has a first arcuate surface 120, and the fixing element 11 has a second arcuate surface 110 operating in conjunction with the first arcuate surface 120. The support element 12 is subjected to pressure from the cot body 20, such that the first arcuate surface 120 rotates across the second arcuate surface 110. The first arcuate surface 120 is smooth, and the second arcuate surface 110 is also smooth; thus, when the support element 12 is subjected to pressure from the cot body 20, the support element 12 rotates about the rotation portion 122, such that the first arcuate surface 120 rotates smoothly across the second arcuate surface 110. Therefore, the carrying device 100 is structurally simple and well-designed.

Referring to FIG. 3, FIG. 8 and FIG. 9, in an embodiment, the support element 12 has a mounting groove 121 operating in conjunction with the fixing element 11. A cam portion 111 is disposed at one end of the fixing element 11 and positioned distal to the cot body 20. The cam portion 111 is disposed in the mounting groove 121. The inner surface of the mounting groove 121 forms the first arcuate surface 120. The outer surface of the cam portion 111 forms the second arcuate surface 110. For instance, the mounting groove 121 comprises a first sidewall and a second sidewall opposing the first sidewall. The mounting groove 121 is disposed between the first sidewall and second sidewall; thus, the cam portion 111 of the fixing element 11 is mounted between the first sidewall and second sidewall. The position-restoring element 13 is also mounted between the first sidewall and second sidewall. The first end portion 132 presses against the fixing element 11. The second end portion 133 presses against the support element 12. The mounting groove 121 has a first sidewall and a second sidewall, such that the fixing element 11 and position-restoring element 13 match the mounting groove 121 well. Alternatively, the mounting groove 121 comprises only one sidewall, and the mounting groove 121 operating in conjunction with the cam portion 111 is concavely disposed on the sidewall. The cam portion 111 rotates across the first arcuate surface 120 of the mounting groove 121. The support element 12 and position-restoring element 13 are mounted on the fixing element 11; then, the support element 12 and position-restoring element 13 are fixed to the fixing element 11 by an engaging block. In this embodiment, the cam portion 111 is disposed in the mounting groove 121 of the support element 12, such that the second arcuate surface 110 of the cam portion 111 matches the first arcuate surface 120 in the mounting groove 121.

Referring to FIG. 8 and FIG. 9, in an embodiment, the position-restoring element 13 is mounted on the mounting portion 112 of the fixing element 11 or mounted on the rotation portion 122 of the support element 12. One end of the position-restoring element 13 resiliently presses against the inner surface (i.e., the first arcuate surface 120) of the mounting groove 121. The other end of the position-restoring element 13 resiliently presses against the inner surface of the cam portion 111. Understandably, the mounting portion 112 is substantially centrally disposed at the fixing element 11, whereas the cam portion 111 is disposed at the periphery of the mounting portion 112. The cam portion 111 comprises the inner surface and the outer surface, wherein the inner surface is near the mounting portion 112. One end of the position-restoring element 13 presses against the inner surface. The outer surface is a second arcuate surface 110. When the support element 12 rotates, the first arcuate surface 120 rotates across the outer surface (i.e., the second arcuate surface 110) of the cam portion 111. In this embodiment, a hole operating in conjunction with a rotating shaft is concavely disposed in the mounting portion 112, and the support element 12 is mounted in place within the hole. A snap-engaging portion which protrudes is disposed at the periphery of the mounting portion 112. The central portion 131 of the position-restoring element 13 is snap-engaged with and mounted on the snap-engaging portion disposed at the periphery of the mounting portion 112. The central portion 131 of the position-restoring element 13 is fittingly mounted on the mounting portion 112 of the fixing element 11. The first end portion 132 of the position-restoring element 13 resiliently presses against the inner surface of the cam portion 111. The second end portion 133 of the position-restoring element 13 resiliently presses against the inner surface of the mounting groove 121. When the support element 12 rotates about the fixing element 11, it compresses the position-restoring element 13. Upon cessation of the compression force, the position-restoring element 13 drives the support element 12 to restore its initial position.

Referring to FIG. 8 and FIG. 9, in an embodiment, the second arcuate surface 110 comprises a first cam surface 1111 and a second cam surface 1112. The support element 12 is subjected to pressure from the cot body 20, such that the mounting groove 121 in contact with the first cam surface 1111 rotates until it comes into contact with the second cam surface 1112. Understandably, when the support element 12 is not subjected to pressure, the mounting groove 121 is in contact with the first cam surface 1111. When the support element 12 is subjected to pressure, the first arcuate surface 120 rotates about the cam portion 111 of the fixing element 11 until the mounting groove 121 comes into contact with the second cam surface 1112; meanwhile, the support element 12 protrudes from the cot body 20. The first cam surface 1111 and second cam surface 1112 are capable of position limitation. When the first arcuate surface 120 rotates across the second arcuate surface 110, the first arcuate surface 120 completely comes into contact with the second cam surface 1112. The support element 12 protrudes from the cot body 20 to provide support and prevent rollovers. When the position-restoring element 13 drives the support element 12 to restore its initial position, the support element 12 rotates until the first arcuate surface 120 completely comes into contact with the first cam surface 1111, such that the support element 12 restores its initial position and constantly tends to protrude outward.

Referring to FIG. 8, in an embodiment, the support element 12 located at the initial position tilts by a predetermined angle in the first direction, such that the support element 12 constantly tends to protrude outward. Thus, the support element 12 tilts from a vertical direction to an outward protruding direction, such that the support element 12 is subjected to pressure from the cot body 20 and thereby protrudes outward. Understandably, the first direction is a vertically downward direction, whereas the predetermined angle is an included angle formed between a support portion 124 and the normal perpendicular to the bottom surface. The predetermined angle ranges from 0° to 45°. For instance, the predetermined angle is 15°, such that the support element 12 not only tends to protrude outward but also prevents the tilted support element 12 from coming into contact with a caretaker's body. The predetermined angle ranges from 0° to 45°, such that support element 12 tends to protrude outward. When the carrycot 101 and carrier body 200 work together, the support element 12 does not interfere with the carrycot 101 and carrier body 200.

Referring to FIG. 3, FIG. 8 and FIG. 9, in an embodiment, a barb portion 123 which is a rounded barb is disposed at one end of the support element 12 and positioned distal to the fixing element 11. Understandably, as soon as the cot body 20 is placed on the support surface, the barb portion 123 comes into contact with the contact surface, and the barb portion 123 comes into contact with the contact surface, such that the contact surface exerts an upward force on the barb portion 123. With the barb portion 123 being rounded, the barb portion 123 tends to rotate under the pressure from the cot body 20, such that the barb portion 123 drives the support element 12 to rotate.

Referring to FIG. 8 and FIG. 9, in an embodiment, the fixing element 11 further comprises a fixing portion 113, and the fixing element 11 is mounted on the bottom board 21 of the cot body 20 through the fixing portion 113. For instance, the fixing portion 113 has a screw hole whereby the fixing element 11 is connected to the cot body 20. The fixing element 11 is integrally formed with the cot body 20 to enhance structural stability. Understandably, owing to the fixing portion 113, the fixing element 11 is firmly mounted on the cot body 20, such that the support element 12 connected to the fixing element 11 is firmly connected to the cot body 20.

Referring to FIG. 3, FIG. 8 and FIG. 9, in an embodiment, the support element 12 has a support portion 124 with a flat structure, and the support portion 124 is in contact with the support surface to allow the cot body 20 to be firmly positioned. When the support element 12 is located at the initial position, the position of the support element 12 is limited by the first cam surface 1111, such that an included angle is formed between the support portion 124 with a flat structure and a vertical axle, allowing the support element 12 to constantly tend to protrude outward. When the support element 12 is on the support surface, the support element 12 is subjected to pressure from the cot body 20 and thus protrudes from the cot body 20, such that the support portion 124 is flat and stable because of the cot body 20. The anti-rollover structure 10 is disposed at one end of the cot body 20.

Referring to FIG. 2, FIG. 4 through FIG. 7, in this embodiment, the cot body 20 is a carrycot 101 applicable to babies. When it is used outdoors, the carrycot 101 with the anti-rollover structure 10 is placed on a support surface, allowing the anti-rollover structure 10 to be activated. The carrycot 101 is structurally simple, easy to use, safe and reliable and thus dispenses with any other complicated operation, thereby enhancing the ease of use of the carrycot 101 by baby caretakers. Moreover, the cot body 20 may also serve any other purposes, for example, functioning as a shopping basket.

Referring to FIG. 1 through FIG. 9, according to the present disclosure, the carrying device 100 comprises the cot body 20 and an anti-rollover structure 10 disposed on the outer bottom surface of the cot body 20. The anti-rollover structure 10 comprises a fixing element 11 mounted on the cot body 20 and a support element 12 movably disposed on the fixing element 11. A position-restoring element 13 with resilience is disposed between the fixing element 11 and the support element 12. When the cot body 20 is in place, the support surface exerts a supporting force on the support element 12, such that the anti-rollover structure 10 is subjected to pressure from the cot body 20, allowing the support element 12 to overcome the resistance of the position-restoring element 13 and thereby move and protrude from the cot body 20. Thus, with the support element 12 protruding from the cot body 20, no rollovers can happen to the cot body 20. Upon cessation of the pressure otherwise exerted by the cot body 20 on the support element 12, the position-restoring element 13 drives the support element 12 to return to its initial position. The anti-rollover structure 10 has a further advantage: under the pressure exerted by the cot body 20, the support element 12 protrudes from the cot body 20 and thus precludes rollovers thereof. Furthermore, the anti-rollover structure 10 is structurally simple and easy to use, allowing the cot body 20 to have an anti-rollover function, be safe, be reliable, and be useful to caretakers. Once the cot body 20 departs from the contact surface, the support element 12 will return to its initial position in the presence of the position-restoring element 13. When the carrycot 101 having the anti-rollover structure 10 works with a stroller, bassinet or playpen, the anti-rollover structure 10 does not protrude from the cot body 20 in the absence of the supporting force and thus does not interfere with an assembly process. When caretakers look after the baby, the anti-rollover structure 10 does not come into contact with the caretakers' legs. According to the present disclosure, the anti-rollover structure 10 is structurally simple and easy to use.

While the present disclosure has been described by means of specific embodiments, numerous modifications and variations could be made thereto by those skilled in the art without departing from the scope and spirit of the present disclosure set forth in the claims.

What is claimed is:

1. An anti-rollover structure, applicable to a cot body, comprising:
   at least two fixing elements adapted to be mounted on an outer bottom surface of the cot body;
   at least two support elements rotatably disposed at the at least two fixing elements respectively;
   wherein when the at least two support elements are on a support surface, the at least two support elements are subjected to pressure from the cot body and thereby rotated to protrude protruded from the cot body; and
   a position-restoring element with resilience, which is disposed between the at least two fixing elements and the at least two support elements,
   wherein the at least two fixing elements respectively have a mounting portion for mounting the at least two support elements, and the at least two support elements are movably mounted on the mounting portion,
   wherein the at least two support elements respectively have a rotation portion operating in conjunction with the mounting portion, and the at least two support elements respectively rotate about the rotation portion relative to the mounting portion, and
   wherein the position-restoring element is penetratingly mounted on the mounting portion or the rotation portion, the at least two fixing elements resiliently press against an end of the position-restoring element, and the at least two support elements resiliently press against another end of the position-restoring element.

2. The anti-rollover structure of claim 1, wherein the at least two support elements are simultaneously rotated to protrude from the cot body when being on the support surface.

3. The anti-rollover structure of claim 1, wherein the at least two support elements are subjected to pressure from the cot body to overcome resistance of the position-restoring element and thereby rotated to protrude from the cot body.

4. The anti-rollover structure of claim 1, wherein the position-restoring element constantly has a position restoration tendency whereby the at least two support elements retreat to the bottom surface of the cot body.

5. The anti-rollover structure of claim 1, wherein the at least two support elements tilt by a predetermined angle in a first direction, such that the at least two support elements constantly tend to protrude outward.

6. The anti-rollover structure of claim 1, wherein an end of each of the at least two support element is positioned distal to the at least two fixing elements and has a rounded barb.

7. The anti-rollover structure of claim 1, wherein the position-restoring element is a torsion spring.

8. The anti-rollover structure of claim 1, wherein the at least two fixing elements further respectively comprise a fixing portion, and the at least two fixing elements are mounted on the cot body through the fixing portions.

9. The anti-rollover structure of claim 1, wherein a support portion is disposed on each of the at least two support elements, and the support portion with a flat structure is in contact with the support surface to prevent roll-overs of the cot body.

10. A carrying device, comprising a cot body, further comprising the anti-rollover structure of claim 1, wherein the at least two fixing elements are mounted on the outer bottom surface of the cot body, and the at least two support elements are subjected to pressure from the cot body and thereby protrude from the cot body.

11. A baby carrier, comprising a carrier body, further comprising the carrying device of claim 10, wherein the cot body is removably disposed at the carrier body.

12. An anti-rollover structure, applicable to a cot body, comprising:

at least two fixing elements adapted to be mounted on an outer bottom surface of the cot body; and at least two support elements rotatably disposed at the at least two fixing elements respectively, wherein when the at least two support elements are on a support surface, the at least two support elements are subjected to pressure from the cot body and thereby rotated to protrude protruded from the cot body, wherein a position-restoring element with resilience is disposed between the at least two fixing elements and the at least two support elements, wherein the at least two support elements respectively have a first arcuate surface, the at least two fixing elements respectively have a second arcuate surface operating in conjunction with the first arcuate surface, and the at least two support elements are subjected to pressure from the cot body, allowing the first arcuate surface to rotate across the second arcuate surface, and wherein the at least two support elements respectively have a mounting groove operating in conjunction with the at least two fixing elements, an end of each of the at least two fixing element is positioned distal to the cot body and disposed in the mounting groove, and the first arcuate surface is formed on an inner surface of the mounting groove.

13. The anti-rollover structure of claim 12, wherein the at least two fixing elements respectively have a cam portion disposed in the mounting groove, and the second arcuate surface is formed on an outer surface of the cam portion.

14. The anti-rollover structure of claim 13, wherein the position-restoring element is mounted on the at least two fixing elements or the at least two support elements, an end of the position-restoring element resiliently presses against the inner surface of the mounting groove, and another end of the position-restoring element resiliently presses against the inner surface of the cam portion.

15. The anti-rollover structure of claim 13, wherein the second arcuate surface has a first cam surface and a second cam surface, and the at least two support elements are subjected to pressure from the cot body, such that the mounting groove in contact with the first cam surface rotates until the mounting groove comes into contact with the second cam surface.

* * * * *